US006943999B2

(12) United States Patent
Gray et al.

(10) Patent No.: US 6,943,999 B2
(45) Date of Patent: Sep. 13, 2005

(54) LOW COST SAFETY SWITCH INTERLOCK DEFEAT OPERATOR

(75) Inventors: Buell E. Gray, Cleveland, TN (US); Richard D. Prohaska, Cleveland, TN (US)

(73) Assignee: Eaton Corporation, Cleveland, OH (US)

( * ) Notice: Subject to any disclaimer, the term of this patent is extended or adjusted under 35 U.S.C. 154(b) by 335 days.

(21) Appl. No.: 10/383,176

(22) Filed: Mar. 6, 2003

(65) Prior Publication Data

US 2004/0174661 A1 Sep. 9, 2004

(51) Int. Cl.[7] .................................................. H02B 1/00

(52) U.S. Cl. ............................ 361/1; 361/609; 361/617

(58) Field of Search ................................ 361/100, 115, 361/1, 609, 617, 641

(56) References Cited

U.S. PATENT DOCUMENTS 4,090,230 A * 5/1978 Fuller et al. ................ 361/617
4,106,607 A * 8/1978 Badavas ................. 192/129 B
6,506,986 B2 * 1/2003 Bernier et al. ........... 200/50.01

* cited by examiner

*Primary Examiner*—Stephen W. Jackson
(74) *Attorney, Agent, or Firm*—Martin J. Moran

(57) ABSTRACT

An apparatus for defeating an interlock for an electrical cabinet permits a technician qualified to service the equipment within the cabinet to defeat the interlock and open the cabinet while current is flowing through the equipment therein, while permitting the interlock to continue to resist unauthorized access to the interior of the cabinet.

18 Claims, 5 Drawing Sheets

LOW COST SAFETY SWITCH INTERLOCK DEFEAT OPERATOR

BACKGROUND OF THE INVENTION

1. Field of the Invention

The present invention relates to interlocks for electrical cabinets. More specifically, the present invention provides an apparatus for defeating an interlock, thereby permitting a technician to open the cabinet when the circuit therein is closed, and thereby facilitating servicing of the equipment therein.

2. Description of the Related Art

Various interlocks are commonly used on cabinets containing electric equipment, to prevent opening of the cabinet when there is current flowing through the equipment. Such interlocks thereby protect personnel working around the equipment from unnecessary risk of injury. However, such interlocks also add difficulty to servicing of the equipment therein. It is sometimes necessary for a technician servicing the equipment to open the cabinet at a time when current is flowing through the equipment therein in order to maintain or repair the equipment.

A presently used interlock bypass mechanism utilizes an arm, pivotally mounted at one end, to push the interlock arm away from the hook in the cabinet door, permitting opening of the cabinet door. The movement of the pivoting arm is controlled by a knob rotationally secured to the arm at the pivot point, located outside the cabinet, and preferably at least partially hidden behind the operating lever of the cabinet. This presently used device includes seven components. A reduction of a number of components would reduce both cost and assembly time for a cabinet utilizing the interlock and interlock defeat mechanism.

Accordingly, there is a need for an improved apparatus for defeating an interlock for an electrical cabinet, thereby facilitating access by technicians qualified to service the cabinet when current is present, while also resisting access by all others to the inside of the cabinet while current is present.

SUMMARY OF THE INVENTION

The present invention provides an apparatus for defeating an interlock for an electrical cabinet. The interlock permits a technician qualified to do so to open the cabinet while current if flowing through the equipment therein, as may be necessary to service this equipment. The interlock also resists attempts by other persons to open the cabinet without first switching off the current.

The interlock with which the present invention is used works off the position of the power switch for the equipment within the cabinet. When the cabinet door is open, an arm is spring-biased outward, so that its opposite end engages a flange on the power switch, thereby precluding the power switch from being moved from its open position to its closed position. When the cabinet is closed, the cabinet door pushes this arm inward, thereby disengaging the arm from the power switch's flange and permitting the power switch to be moved between its open and closed positions. Moving the power switch to its closed position moves an interlock latch to a position wherein it engages a hook in the door, thereby resisting the opening of the door until the power is switch is moved from its closed to its open position.

The interlock defeat of the present invention includes a spring-biased peg protruding through the cabinet's side wall, adjacent the interlock latch, and behind the power switch. The position of the interlock defeat behind the power switch serves to hide it from persons unauthorized to open the cabinet while current is flowing. When a qualified technician wishes to open the cabinet, he may use a screwdriver or similar object to push the interlock defeat mechanism against the latch, thereby pushing the latch away from the hook and permitting the cabinet to be opened.

BRIEF DESCRIPTION OF THE DRAWINGS

Like reference numbers denote like elements throughout the drawings.

DETAILED DESCRIPTION

The present invention provides a defeat mechanism for an interlock, permitting qualified personnel to open an electrical cabinet secured by the interlock when current is flowing through the electrical equipment therein.

Figure 1:
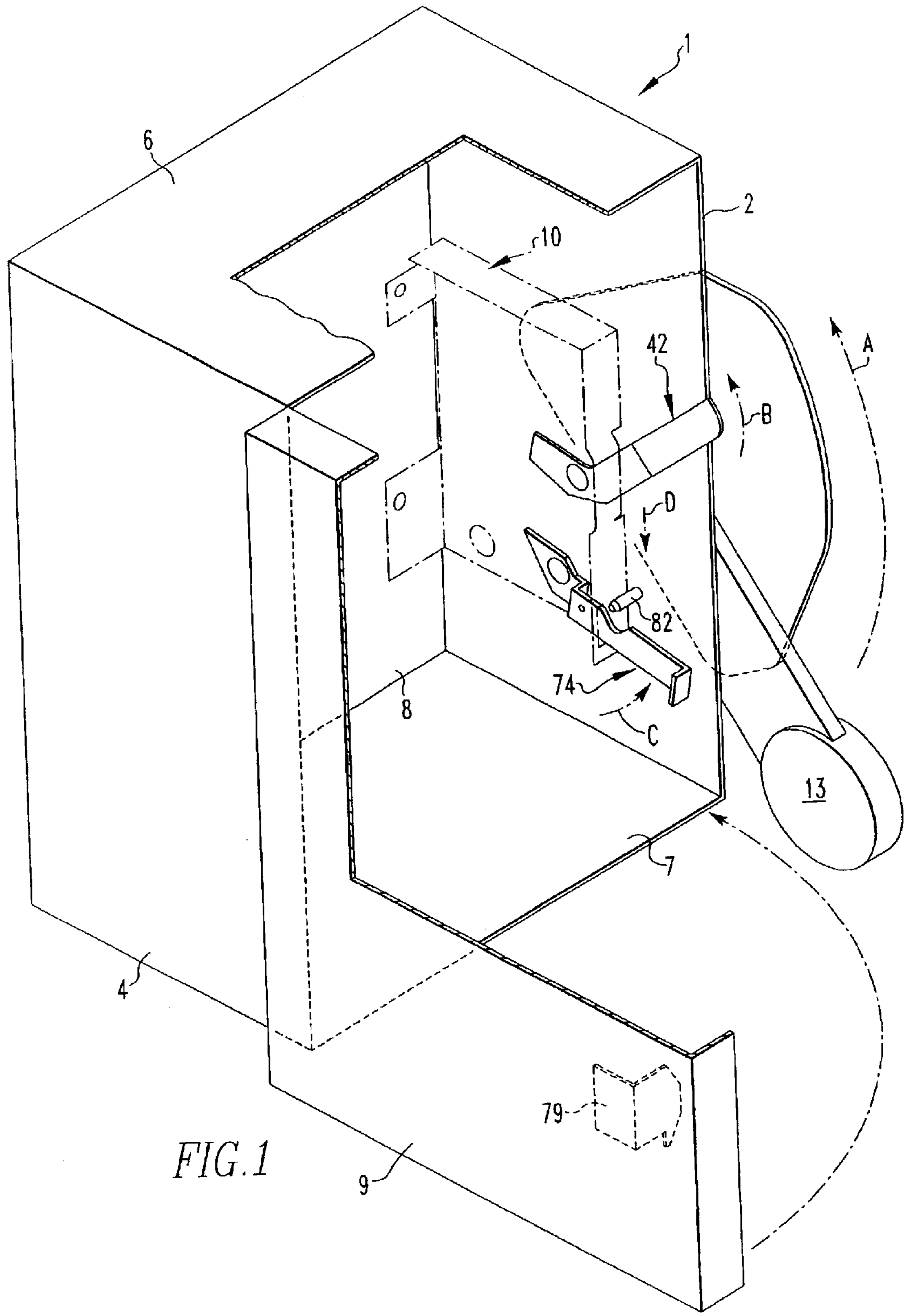
FIG. 1 is an isometric front view of a cabinet incorporating an interlock and an interlock defeat mechanism of the present invention.

A cabinet 1, shown in FIG. 1, with which the interlock defeat will be used will include a pair of sides 2, 4, a top 6, a bottom 7, a back 8, and a hingedly secured door 9. Typically, if the door is hingedly secured to the second of the two sides, the interlock holding the door closed will be secured to the first of the two sides.

Figure 2:
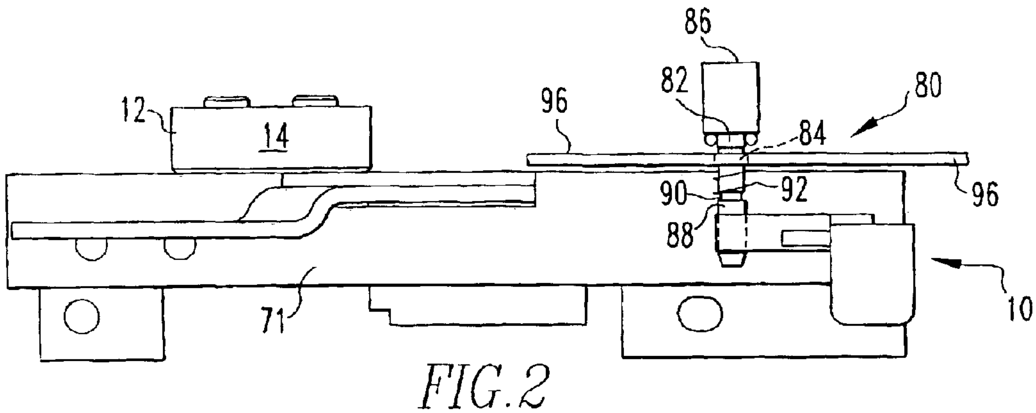
FIG. 2 is a top view of an interlock and interlock defeat mechanism according to the present invention, illustrating the interlock in a position wherein it will preclude closing the circuit while the cabinet is open.
Figure 3:
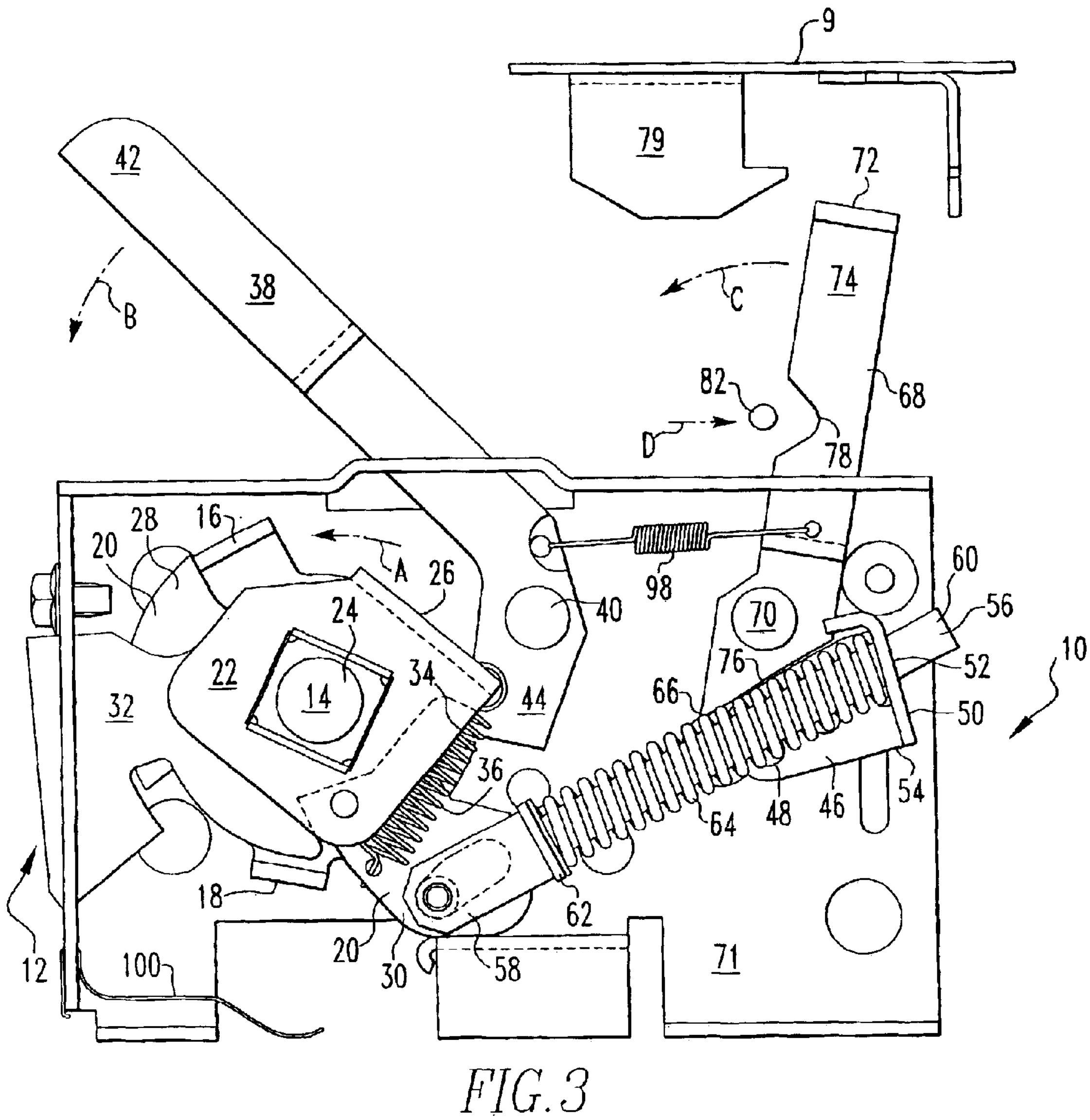
FIG. 3 is a side view of an interlock and interlock defeat mechanism according to the present invention, illustrating the interlock in a position wherein it will preclude closing the circuit while the cabinet is open.

Referring to FIGS. 2–3, an interlock mechanism 10 with which the present invention will be used is illustrated. The interlock mechanism 10 is best understood through an explanation of the working of the power switch assembly 12. The power switch assembly 12 includes an operating handle 13 secured to a mechanism drive hub 14. The operating handle 13 is illustrated in FIG. 1 in the off position, and moves in the direction of arrow A to the on position. The mechanism drive hub 14 is connected to a pair of flanges 16, 18, that rotate simultaneously with the mechanism drive hub 14. As will be explained below, the flanges 16,18 control the pivoting of an interlock actuator 20, and a switch drive shaft receptacle 22, both of which pivot coaxially with the mechanism drive hub 14. The mechanism drive hub 14 further defines at least one lip 34, located on the outer circumference of the mechanism drive hub 14.

The interlock actuator 20 includes a first arm 28, adjacent to the flange 16, and a second arm 30 adjacent to the flange 18. The switch drive shaft receptacle includes a shaft interface aperture 24, and a side flange 26. The switch drive shaft receptacle also includes a radial extension 32, extending outward between the flanges 16 and 18. The radial extension 32 is preferably sufficiently long so that it will depress a flat spring 100 located on the first side, as it passes the flat spring 100. A spring 36 connects the side flange 26 with the arm 30.

An arm 38, pivotally secured to the cabinet's first side at pivot 40, extends outwards towards the door 9 of the cabinet 1. The arm 38 includes a door-engaging end 42, and a pivot-engaging end 44. The pivot-engaging end 44 is dimensioned and configured to engage the lip 34 when the cabinet's door 9 is open, and the power switch assembly 12 is in its open position, at which time the arm 38 will be spring-biased outward, preferably by the spring 98. The power switch assembly 12 will thereby be prevented from moving to the on position when the cabinet door 9 is open. Closing the cabinet door will pivot the door-engaging end 42 inward and the pivot-engaging end 44 away from the lip 34, permitting movement of the power switch assembly 12.

The interlock mechanism 10 also includes a cam 46 pivotally secured to the cabinet's first side at the cam's first end 48, and having a substantially perpendicular flange 50, defining a slot 52 therein, at its second end 54. An actuating rod 56 is pivotally secured at its first end 58 to the arm 30, and passes through the slot 52 at its second end 60. The first end 58 of the actuating rod 56 includes a spring-retaining lip 62. A spring 64 fits around the actuating rod 56, being compressed between the spring-retaining lip 62 and the flange 50. The first end 48 of the cam 46 also defines a camming surface 66.

A latch 68 is pivotally secured adjacent to the first side of the cabinet at its pivot end 70, typically by being pivotally secured to a mechanism frame assembly 71, which is secured adjacent to the first side of the cabinet. The latch 68 defines a substantially perpendicular hook-engaging tip 72 at its hook-engaging end 74. The pivot end 70 includes a cam-engaging surface 76, dimensioned and configured to engage the camming surface 66 of the cam 46. The tip 72 is dimensioned and configured to engage a hook 79 depending from the door 9 of the cabinet 1, when the door 9 is closed. The latch is biased towards the hook 79, preferably by the spring 98. The latch 68 further defines a defeat-receiving notch 78, between its pivot end 70 and its hook-engaging end 74.

Figure 4:
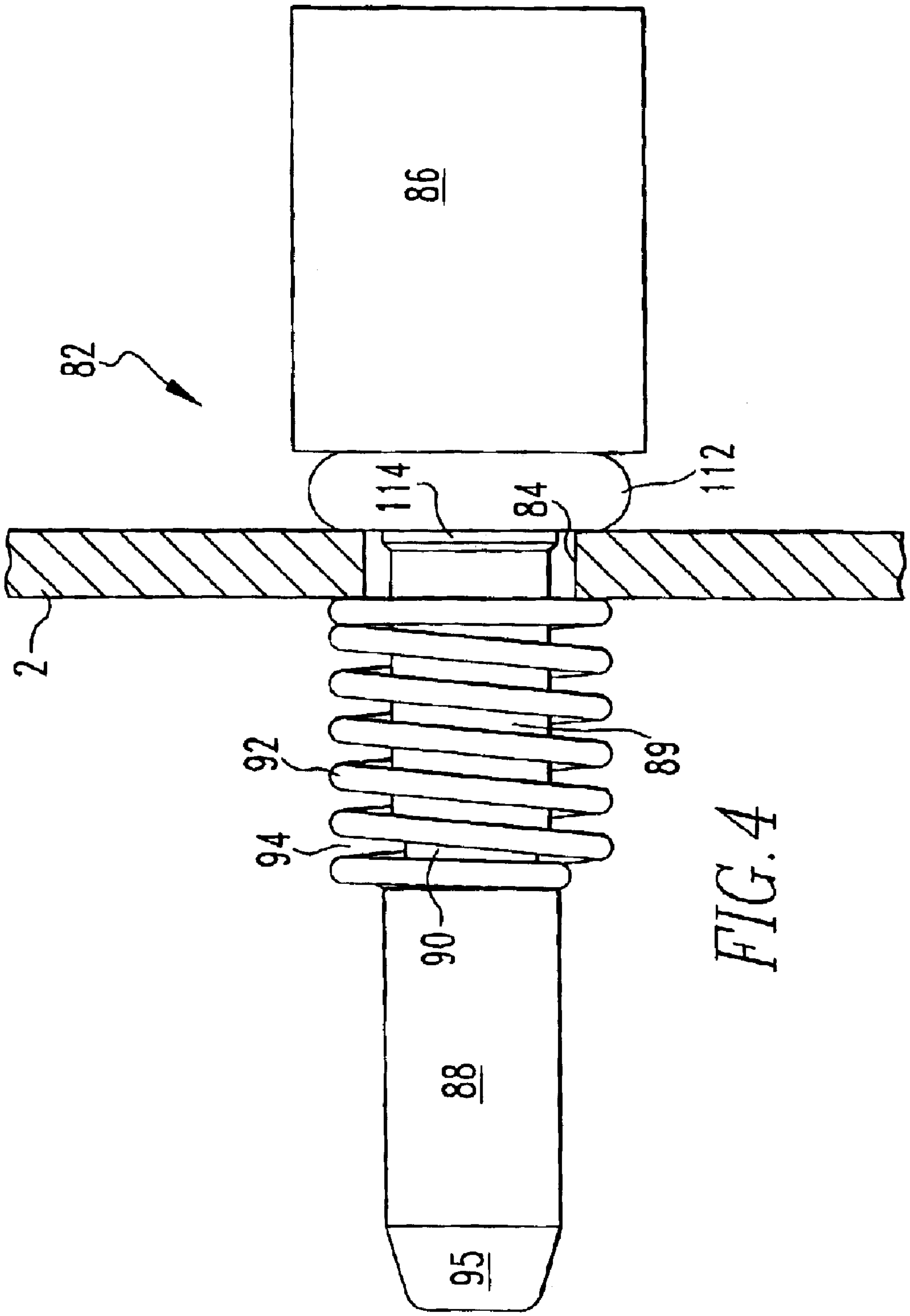
FIG. 4 is a side view of a peg for an interlock defeat mechanism of the present invention.

Referring to FIGS. 2–4, the interlock defeat 80 includes a peg 82 protruding through an aperture 84 within the first side 96 of the cabinet. The peg 84 includes an actuator end 86, located outside the cabinet, and a latch-engaging end 88, permitting the peg 82 to have a greater range of angular motion within the aperture 84. A reduced diameter portion 89 is defined between the actuator end 86 and latch-engaging end 88. A circumferential groove 90 is defined between the reduced diameter portion 89 and latch-engaging end 88, and is located inside the cabinet. A spring 92, having a reduced diameter portion 94 dimensioned and configured to be secured within the circumferential groove 90, is compressed between the circumferential groove 90 and the cabinet's first side 2. The tapered tip 95 of the peg 82 facilitates insertion of the peg 82 through the reduced diameter portion 94 during assembly. The spring 94 biases the peg 82 into a substantially perpendicular orientation with respect to the first side 2. The peg may also include an O-ring 112, retained between the actuator end 86 and first side 2. The spring 94 ensures that the O-ring 112 is pressed against the first side 2 to provide a water-resistant seal between the peg 82 and first side 2. A shoulder 114 defined around the peg 82, adjacent to the O-ring 112, centers the peg 82 within the aperture 84, ensuring that the O-ring 112 overlaps the first side 2 around its entire circumference.

When the cabinet door 9 is open, the components will be in the positions shown in FIGS. 2 and 3. The power switch assembly 12 will typically be in the off position as illustrated. The spring 98 will bias the arm 38 outward, engaging the lip 34 with the pivot-engaging end 44 of the arm 38, preventing the switch 12 from being rotated into the on position. The interaction of the camming surfaces 66, 76 will hold the latch 68 away from the hook 79, against the bias of the spring 98, thereby permitting the door 9 to open and close freely.

Figure 5:
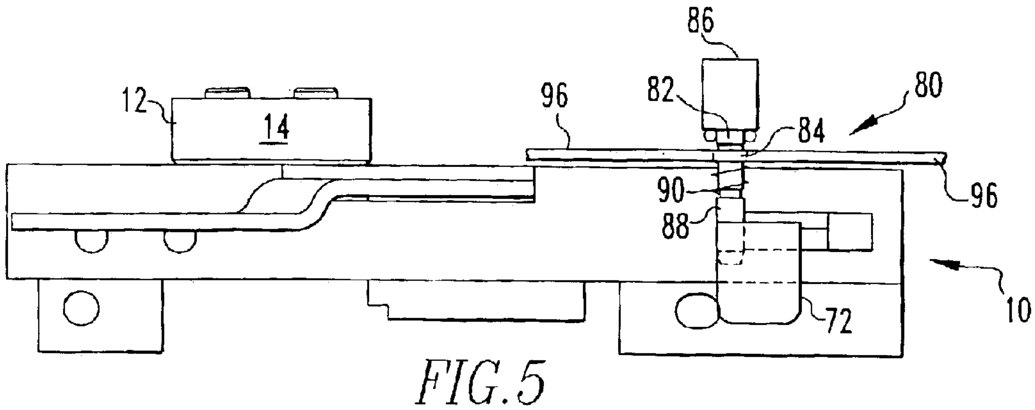
FIG. 5 is a top view of an interlock and interlock defeat mechanism according to the present invention, illustrating the interlock in a position wherein it will resist opening of the cabinet when current is flowing through the equipment within the cabinet.

When the door 9 is closed, the door 9 will push inward in the direction of arrow B on the end 42 of the arm 38, thereby disengaging the pivot-engaging end 44 from the lip 34, permitting the power switch assembly 12 to be rotated. The power switch assembly 12 may then be rotated to the on position, illustrated in FIGS. 5–6. As the operating handle 13 is rotated in the direction of arrow A, the flanges 16, 18 will engage the arms 28, 30 causing the arms 28 and 30 to rotate with the power switch assembly 12. Additionally, the flange 16 will engage the flange 32, causing the switch drive shaft receptacle 22 to rotate with the power switch assembly 12. The power switch assembly 12 will in some embodiments rotate a short distance before the flanges 16, 18 engage the arms 28, 30 and the flange 32, so that the switch 12 will move ahead of the other components. As the arm 30 rotates, the spring 64 will be compressed, and the cam 46 will also rotate. Once the arm 30 has rotated slightly more than halfway, the spring 64 will push the arm 30 through the remainder of its rotation. The arm 30 will engage the side flange 26, thereby rotating the switch drive shaft receptacle 22 through the remainder of its rotation. By using this overcenter camming mechanism, the switch drive shaft receptacle is held in whichever position it is presently in—whether that position is on or off—until the power switch assembly 12 is rotated through most of its rotation, and is then switched into the opposite position once the rotation of the power switch assembly 12 is almost complete. As the spring 64 pushes the arm 30 through the remainder of its rotation, the cam 46 will also rotate, so that the interaction between the camming surfaces 66, 76 will push the latch 68 in the direction of arrow C into a position where the tip 72 will engage the hook 79, preventing the cabinet door from being opened. The latch 68 will be held in this position by the spring 98.

To open the cabinet 1, most personnel will first be required to move the power switch assembly 12 to the off position. As the power switch assembly 12 is rotated, the flange 18 will engage the arm 28, thereby rotating the interlock actuator 20. The arm 30 will pull the switch drive shaft receptacle 22 through part of its rotation through the spring 36, until the flange 32 strikes the flat spring 100. At this point, because the flat spring 100 is more powerful than the spring 36, the switch drive shaft receptacle 22 will stop rotating until the arm 30 rotates slightly more than halfway, at which point the spring 64 will extend, forcing the arm 30 through the remainder of its rotation. At the same time, the arm 30 will engage the switch drive shaft receptacle 22, forcing the switch drive shaft receptacle 22 through the remainder of its rotation. The components are now positioned as illustrated in FIGS. 2–3.

Figure 6:
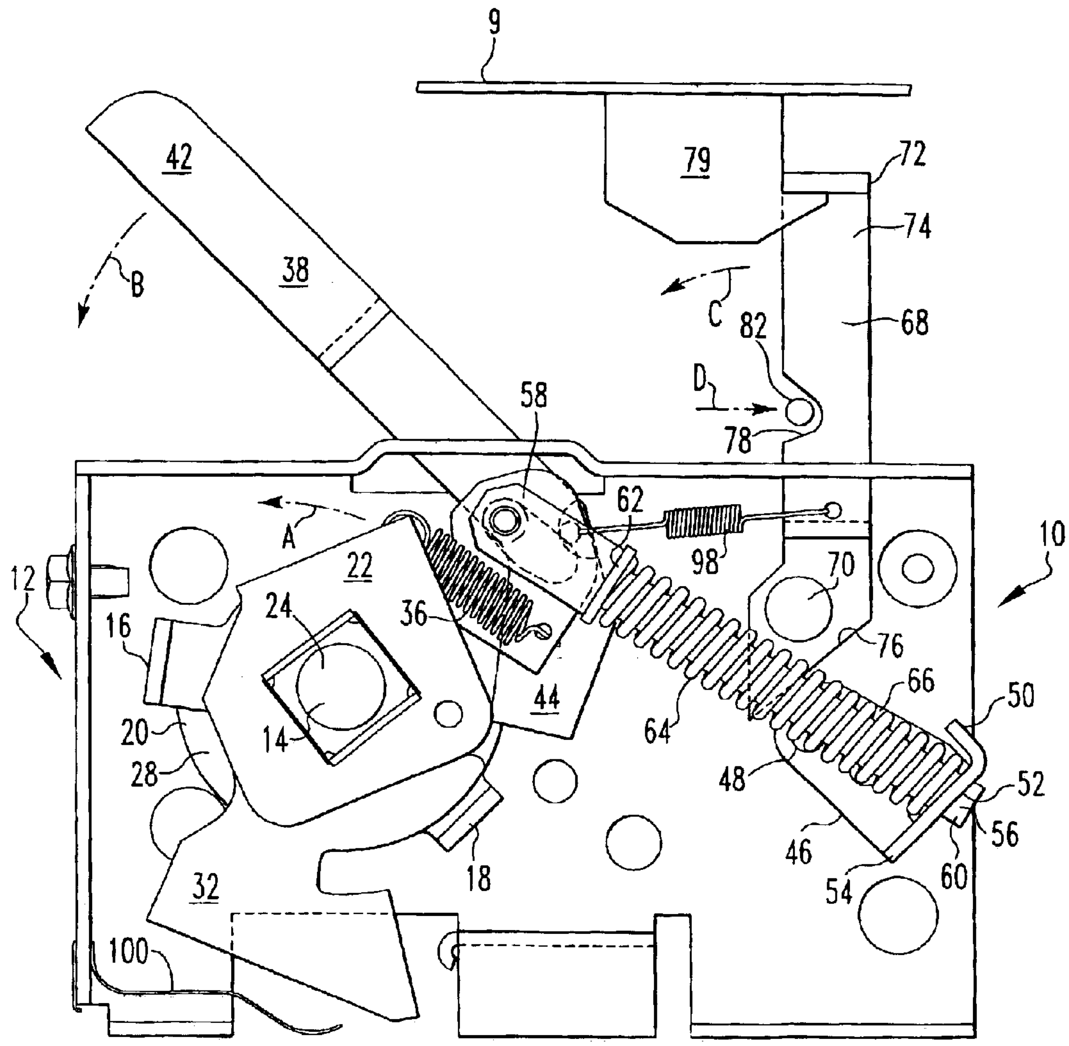
FIG. 6 is a side view of an interlock and interlock defeat mechanism according to the present invention, illustrating the interlock in a position wherein it will resist opening of the cabinet when current is flowing through the equipment within the cabinet.
Figure 7:
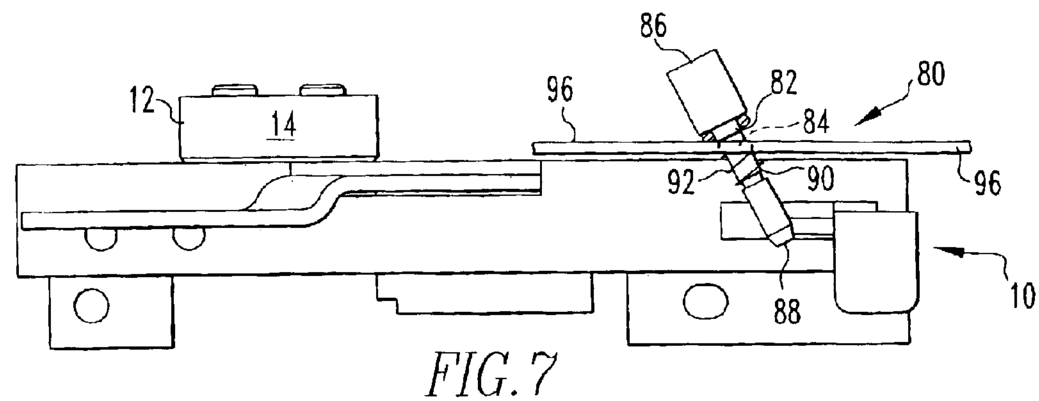
FIG. 7 is a top view of an interlock and interlock defeat mechanism according to the present invention, illustrating the use of the interlock defeat mechanism to defeat the interlock and permit opening of the cabinet.
Figure 8:
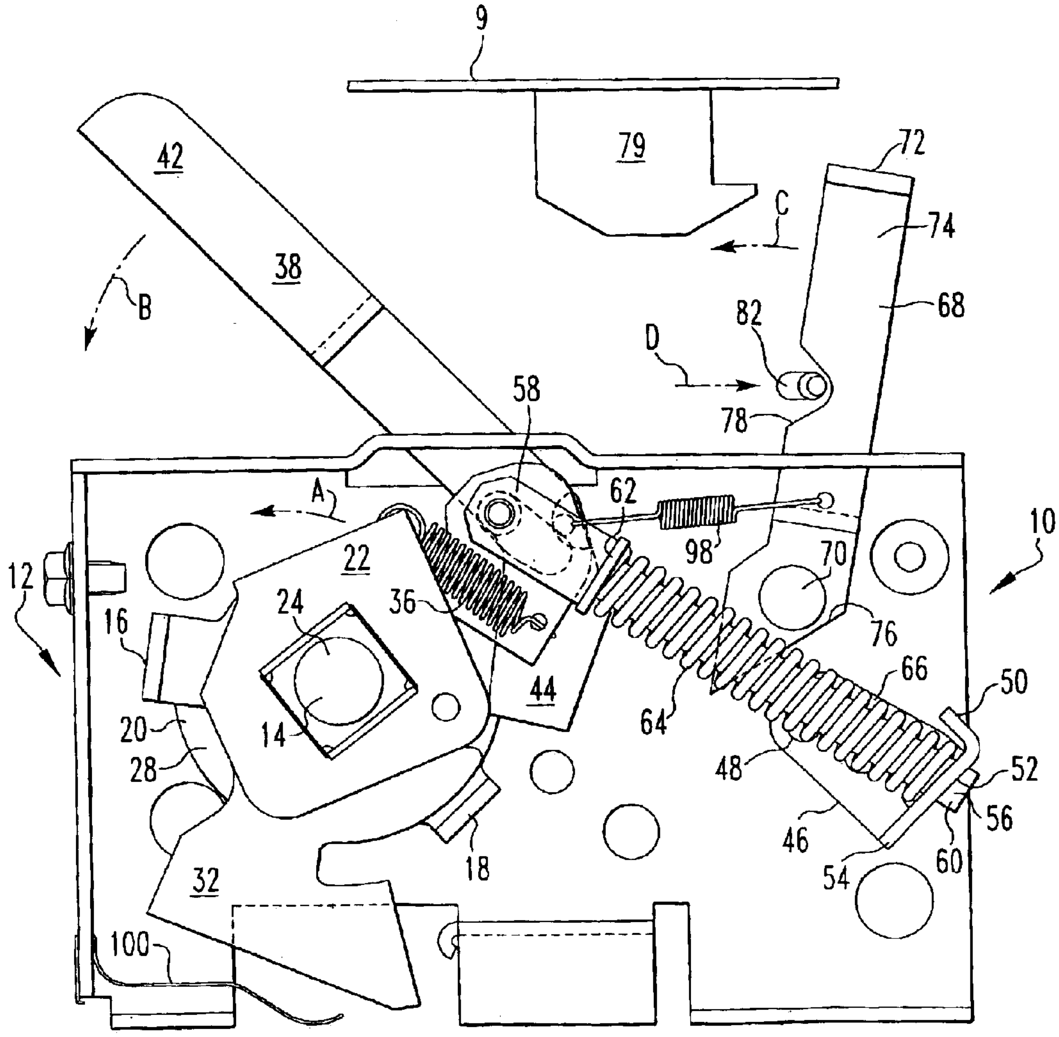
FIG. 8 is a side view of an interlock and interlock defeat mechanism according to the present invention, illustrating the use of the interlock defeat mechanism to defeat the interlock and permit opening of the cabinet.

In the event that servicing the equipment within the cabinet requires the cabinet to be opened while current is flowing through the equipment, personnel qualified to do so may use the interlock defeat 80 to open the cabinet door. The actuator end 86 of the interlock defeat is at least partially hidden from sight behind the power switch assembly 12, thereby helping to preserve the function of the interlock in preventing unauthorized access to the interior of the cabinet. However, as shown in FIGS. 6–7, by pushing on the actuator end 86 of the peg 82, for example, with a screwdriver or a similar object, the latch-engaging end 88 of the peg 82 is pushed in the direction of arrow D into the defeat-engaging notch 78 of the latch 68, thereby pushing the latch 68 away from the hook 78, and permitting the cabinet door 9 to be opened. When the peg 82 is released, the spring 92 will push the peg 82 back to its original position. The actuator end 86 of the peg 82 may be reached by a screwdriver from either the front or the side of the cabinet.

While a specific embodiment of the invention has been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any and all equivalents thereof.

What is claimed is:

1. An interlock defeat for an electrical cabinet, the cabinet having a first side, a second side, a top, a bottom, a back, the first side defining an interlock defeat aperture; a door hingedly attached to the second side, the door having a hook thereon, adjacent to the first side when the door is closed, a power switch being movable between an on position and an off position, an interlock adjacent to the interlock defeat aperture, the interlock having a latch, the latch having a pivot end pivotally secured adjacent to the first side, and a hook end opposite the pivot end, the latch being operatively connected to the power switch so that the latch's hook end is spring-biased towards and engages the hook when the power switch is in the on position, and the power switch is disengaged from the hook when the power switch is off, the interlock defeat comprising:

a peg secured within the interlock defeat aperture, the peg having an inside end within the cabinet and an outside end outside the cabinet, the peg being dimensioned and configured to move its inside end towards the latch and push the latch away from the hook, causing the latch to disengage the hook, in response to a force applied to its outside end, the peg being biased towards a position wherein it permits engagement of the hook by the latch.

2. The interlock defeat according to claim 1, wherein the interlock defeat is at least partially hidden from view.

3. The interlock defeat according to claim 2, wherein the interlock defeat is at least partially hidden from view by being located behind the operating handle assembly.

4. The interlock defeat according to claim 1, wherein the interlock defeat is spring-biased towards a substantially perpendicular orientation with respect to the first side.

5. The interlock defeat according to claim 1, wherein the interlock defeat is spring-biased towards a position wherein it permits engagement of the hook by the latch by a coil spring surrounding the peg, compressed between the first side and a spring retaining means defined on the peg.

6. The interlock defeat according to claim 5, wherein:

the spring retaining means is a circumferential groove defined in the peg; and the spring includes a reduced diameter portion dimensioned and configured to engage the circumferential groove.

7. The interlock defeat according to claim 5, wherein:

the spring retaining means is defined on the inner end of the peg; and the spring surrounds the inner end of the peg.

8. The interlock defeat according to claim 1, further comprising:

a latch-actuating rod pivotally secured to the power switch at a point radially separated from a pivot axis of the power switch, the latch-actuating rod having a first end and a second end;

a cam having a first end pivotally secured to the first side, and a second end defining a slot dimensioned and configured to receive an end of the latch-actuating rod, the cam's second end being a greater distance from the pivot than the cam's first end, the cam's first end further defining a camming surface having a convex curve;

a spring surrounding the latch-actuating rod, compressed between the rod's first end and the cam's second end, the latch's pivot end further defining a latch camming surface dimensioned and configured to engage the cam's camming surface, and the cam pivoting between a first position and a second position responsive to pivoting of the power switch, the first position corresponding to the power switch's off position, the second position corresponding to the power switch's on position, with the engagement of the cam's camming surface and the latch camming surface pivoting the latch to engage the door's hook when the power switch is moved to the on position, and to disengage the hook when the switch is moved to the off position.

9. A cabinet for electrical equipment, the cabinet comprising:

a first side, a second side, a top, a bottom, and a back, the first side defining an interlock defeat aperture;

a door hingedly attached to the second side, the door having a hook thereon, adjacent to the first side when the door is closed;

a power switch being movable between an on position and an off position;

an interlock adjacent to the interlock defeat aperture, the interlock having a latch, the latch having a pivot end pivotally secured adjacent to the first side, and a hook end opposite the pivot end, the latch being operatively connected to the power switch so that the latch's hook end is spring-biased towards and engages the hook when the power switch is in the on position, and the power switch is disengaged from the hook when the power switch is off; and an interlock defeat, having a peg secured within the interlock defeat aperture, the peg having an inside end within the cabinet and an outside end outside the cabinet, the peg being dimensioned and configured to move its inside end towards the latch and push the latch away from the hook, causing the latch to disengage the hook, in response to a force applied to its outside end, the peg being biased towards a position wherein it permits engagement of the hook by the latch.

10. The cabinet according to claim 9, wherein the interlock defeat is at least partially hidden from view.

11. The cabinet according to claim 10, wherein the interlock defeat is at least partially hidden from view by being located behind the operating handle assembly.

12. The cabinet according to claim 9, wherein the interlock defeat is spring-biased towards a substantially perpendicular orientation with respect to the first side.

13. The cabinet according to claim 9, wherein the interlock defeat is spring-biased towards a position wherein it permits engagement of the hook by the latch by a coil spring surrounding the peg, compressed between the first side and a spring retaining means defined on the peg.

14. The cabinet according to claim 13, wherein:

the spring retaining means is a circumferential groove defined in the peg; and the spring includes a reduced diameter portion dimensioned and configured to engage the circumferential groove.

15. The cabinet according to claim 13, wherein:

the spring retaining means is defined on the inner end of the peg; and the spring surrounds the inner end of the peg.

16. The cabinet according to claim 9, wherein the interlock further comprises a door-engaging arm, the arm having a door-engaging end, a power switch engaging end, and a pivot therebetween, the arm pivoting between a first position wherein the power switch engaging end abuts a corresponding flange on the power switch, thereby resisting rotation of the power switch from the off position to the on position, and a second position wherein the power switch engaging end disengaged the flange on the power switch, the arm being spring-biased towards said first position, and the arm being dimensioned and configured to rotate from the first position to the second position in response to closing of the cabinet door.

17. The cabinet according to claim 16, wherein the interlock latch and door-engaging arm are both spring-biased by a single spring having two ends, with one of the ends connected to the latch, and the other of the two ends connected to the arm.

18. The cabinet according to claim 9, further comprising:

a latch-actuating rod pivotally secured to the power switch at a point radially separated from a pivot axis of the power switch, the latch-actuating rod having a first end and a second end;

a cam having a first end pivotally secured to the first side, and a second end defining a slot dimensioned and configured to receive an end of the latch-actuating rod, the cam's second end being a greater distance from the pivot than the cam's first end, the cam's first end further defining a camming surface having a convex curve;

a spring surrounding the latch-actuating rod, compressed between the rod's first end and the cam's second end, the latch's pivot end further defining a camming surface dimensioned and configured to engage the cam's camming surface, and the cam pivoting between a first position and a second position responsive to pivoting of the power switch, the first position corresponding to the power switch's off position, the second position corresponding to the power switch's on position, with the engagement of the cam's camming surface and the latch's camming surface pivoting the latch to engage the door's hook when the power switch is moved to the on position, and to disengage the hook when the switch is moved to the off position.

* * * * *